(12) United States Patent
Hegde et al.

(10) Patent No.: US 12,505,191 B2
(45) Date of Patent: Dec. 23, 2025

(54) IDENTIFICATION, VALIDATION AND AUTHENTICATION USING BIOLOGICAL PATTERNS AND NUMBERS

(71) Applicant: Kyndryl, Inc., New York, NY (US)

(72) Inventors: Vinay Kumar Gajanana Hegde, Bangalore (IN); Omar Odibat, Cedar Park, TX (US); Cesar Augusto Rodriguez Bravo, Alajuela (CR)

(73) Assignee: KYNDRYL, INC., New York, NY (US)

( * ) Notice: Subject to any disclaimer, the term of this patent is extended or adjusted under 35 U.S.C. 154(b) by 111 days.

(21) Appl. No.: 18/545,154

(22) Filed: Dec. 19, 2023

(65) Prior Publication Data

US 2025/0200156 A1    Jun. 19, 2025

(51) Int. Cl.
*G06F 21/00*  (2013.01)
*G06F 21/32*  (2013.01)

(52) U.S. Cl.
CPC .................................. *G06F 21/32* (2013.01)

(58) Field of Classification Search
CPC ....................................................... G06F 21/32
See application file for complete search history.

(56) References Cited

U.S. PATENT DOCUMENTS

| | | | |
|---|---|---|---|
| 6,393,139 B1 * | 5/2002 | Lin | G07C 9/37 382/125 |
| 7,136,514 B1 | 11/2006 | Wong | |
| 7,212,655 B2 | 5/2007 | Tumey et al. | |
| 8,550,339 B1 * | 10/2013 | Newman | G07C 9/37 340/5.82 |
| 9,361,507 B1 | 6/2016 | Hoyos et al. | |
| 10,133,911 B2 | 11/2018 | Hao et al. | |
| 10,764,280 B2 | 9/2020 | Kim et al. | |
| 10,990,659 B2 | 4/2021 | Mehedy | |
| 11,351,964 B1 | 6/2022 | Schulz et al. | |
| 2007/0140530 A1 * | 6/2007 | Coogan | G06F 3/04886 340/5.53 |
| 2015/0178542 A1 * | 6/2015 | Minteer | G06V 40/1306 382/124 |
| 2015/0319168 A1 * | 11/2015 | McCarty | H04L 63/0861 713/186 |

(Continued)

*Primary Examiner* — William A Corum, Jr.
(74) *Attorney, Agent, or Firm* — CANTOR COLBURN LLP; Erik Swanson

(57) ABSTRACT

Embodiments relate to a computer implemented method for identifying, validating and authenticating a user using biological patterns and numbers. The method includes prompting a user to enter a password into an authentication software, where the password is responsive to selected user fingers, selected user fingerprints and a selected entry pattern of the user fingers and user fingerprints. A biometric sensing device is operated to obtain biometric data responsive to sensed user fingers, sensed user fingerprints and a sensed entry pattern. The biometric data is processed to determine characteristic features of at least one of the sensed user fingers, the sensed user fingerprints and the sensed entry pattern and the characteristic features is compared with the user data to determine if the characteristic features match the user data. The user is allowed or denied entry into a computer system responsive to whether the characteristic features match the user data.

20 Claims, 9 Drawing Sheets

(56) References Cited

U.S. PATENT DOCUMENTS

| | | | |
|---|---|---|---|
| 2016/0034673 A1* | 2/2016 | Chandra | H04L 63/0861 |
| | | | 726/7 |
| 2016/0063230 A1* | 3/2016 | Alten | G06F 21/32 |
| | | | 726/28 |
| 2018/0349588 A1* | 12/2018 | Abdelmoneum | G06F 21/32 |
| 2020/0372142 A1* | 11/2020 | Huang | G06F 21/316 |
| 2022/0147603 A1* | 5/2022 | Liu | G06V 40/1306 |
| 2023/0262054 A1* | 8/2023 | Marasco | H04L 63/0861 |
| | | | 726/4 |
| 2024/0202301 A1* | 6/2024 | Song | G06V 40/67 |
| 2025/0265320 A1* | 8/2025 | Kuhne | G06F 21/32 |

* cited by examiner

IDENTIFICATION, VALIDATION AND AUTHENTICATION USING BIOLOGICAL PATTERNS AND NUMBERS

BACKGROUND

The present invention generally relates to computer systems, and more specifically, to computer-implemented methods, computer systems, and computer program products configured to identify, validate and authenticate a user or a transaction using biological patterns and numbers.

Secure computer systems typically include one or more authenticators and methods for validating and authenticating a user or a transaction. These authenticators and/or methods may include the use of a password (e.g., a combination of words, special characters and/or numbers), a number based Personal Identification Number (PIN), a pre-recognized and approved fingerprint scan and/or a pre-recognized and approved facial/retina recognition scan. In order to try and ensure security of the passwords/PINS, some of these authenticators and/or methods may require that a user periodically updates/changes the passwords/PINs after a predetermined period of time, for example every three to six months. Unfortunately, when multiple passwords/PINs and computer systems are involved, the task of remembering, storing and updating passwords/PINS becomes overwhelming and daunting. Thus, this problem of having to remember too many passwords/PINs typically results in a user forgetting and resetting the passwords/PINs multiple times.

SUMMARY

Embodiments are directed to a computer-implemented method for identifying, validating and authenticating a user using biological patterns and numbers. A non-limiting computer-implemented method includes prompting a user to enter a password into an authentication software, wherein the password is responsive to a plurality of selected user fingers, a plurality of selected user fingerprints and a selected entry pattern of the user fingers and the user fingerprints. The method includes operating a biometric sensing device to obtain biometric data responsive to sensed user fingers, sensed user fingerprints and sensed entry pattern and processing the biometric data to determine characteristic features of at least one of the sensed user fingers, the sensed user fingerprints and the sensed entry pattern. The method further includes comparing the characteristic features with user data to determine if the characteristic features match the user data and allowing or denying entry of the user into a computer system responsive to the characteristic features.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
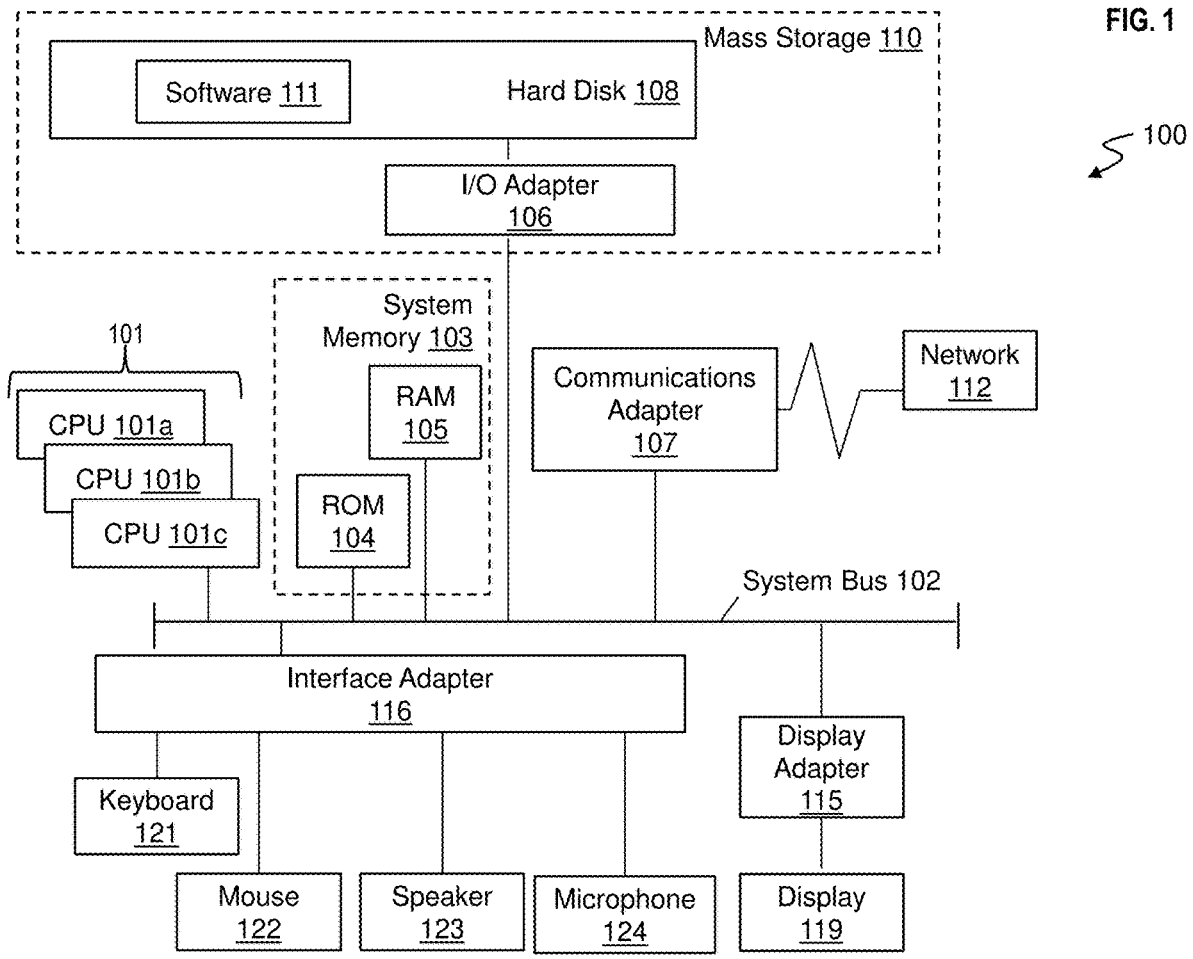
FIG. 1 depicts a block diagram of an example computer system for use in conjunction with one or more embodiments of the present invention.

As discussed briefly hereinabove, one of the problems that exists with current authentication/validation methods involves the use of security features, such as user passwords/PINs. As these security features are used on multiple systems that people use on a daily basis, such as Credit Card machines, ATMs, Operating System (OS), and other software applications, users not only have to remember multiple passwords/PINs, but also which multiple passwords/PINs correlate to a specific device or application. Additionally, authentication/validation methods employed by these systems try to ensure security of the system by using passwords/PINs having specific characteristics (such as minimum length and use of special characters) and by possibly requiring that the user periodically update/change the password/PIN after a predetermined period of time, for example every three to six months. Thus, this problem of having to remember and correlate too many passwords/PINs with specific applications becomes overwhelming and typically results in the user forgetting the password/PIN and resetting the password/PIN multiple times.

One or more embodiments provide a method for identifying, validating and authenticating a user or a transaction using biological patterns and numbers, where the method follows a Best Heuristic Approach for Identification, Validation & Authentication (BHAIVA) model. The method includes using selected fingers and relevant fingerprints as numbers rather than passwords and PINs in systems that use authentication/validation, such as ATMs, Software Applications and Operating Systems. An embodiment provides a method which follows a BAHIVA approach, and which uses the fingerprints of a user as a single source to accomplish dual and/or multiple authentications. In this case, using the fingers of the user to replace numbers acts as a first level of identification/authentication and using the fingerprints of the user acts as a secondary source of identification/authentication.

One or more embodiments provide a method for identifying, validating and authenticating a user or a transaction using biological patterns and numbers, where a computer system is configured to apply the method by using the fingers and selected fingerprints of a user in a sequential order in order to provide a system having a secure authentication/validation factor which yields 1023 possible combinations. One or more embodiments provide a system that is configured to use between 1 and 10 fingers, and the respective fingerprints, in a sequential manner to provide two levels of authentication security. This first level and secondary level of authentication/validation provides for a secure authentication/validation interface without the requirement of a user having to remember, store and update multiple passwords across multiple systems.

One or more embodiments provide a method for identifying, validating and authenticating a user or a transaction using biological patterns and numbers, where a computer system is configured to apply the method by using the fingers and selected fingerprints of a user in a cluster fashion in order to provide a system having a secure authentication/validation factor which yields up to 3,628,800 possible combinations. Moreover, in another embodiment both fingers and toe may be used in a sequential and/or cluster fashion thereby providing for an additional 3,628,800 possible combinations (or 20 factorial (20!) total possible combinations). One or more embodiments provide a system that is configured to use between 1 and 10 fingers of a user, and the respective fingerprints, in a cluster format to provide two levels of authentication security. This first level and secondary level of authentication/validation provides for a secure authentication/validation interface without the requirement of a user having to remember, store and update multiple passwords across multiple systems.

While in another embodiment, a system may be configured to apply the method by using the fingers and toes of a user, along with the respective fingerprints and toeprints of the user, in a sequential or cluster format in order to provide a system having a secure identification/authentication ability which yields over one hundred trillion possible combinations.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
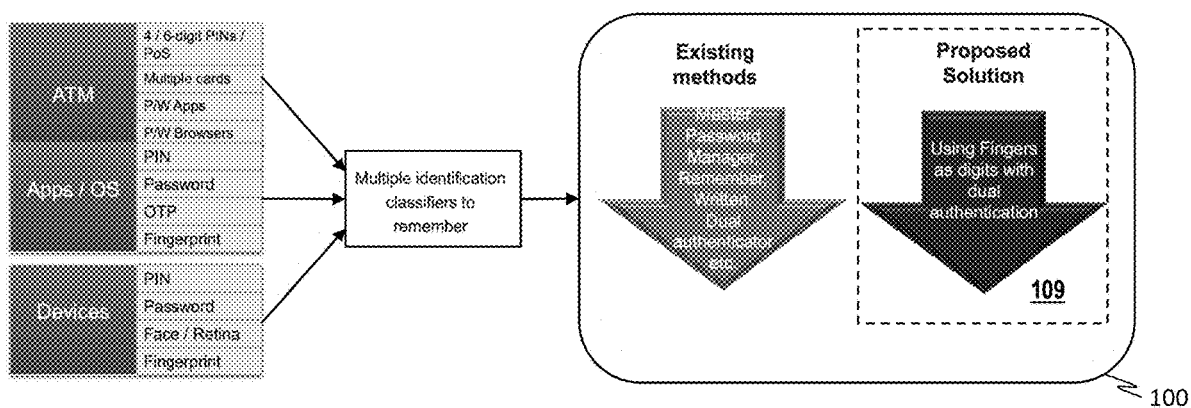
FIG. 2 depicts a block diagram illustrating a method for identifying, validating and authenticating a user using biological patterns and numbers alongside current methods, according to one or more embodiments of the present invention.
Figure 3:
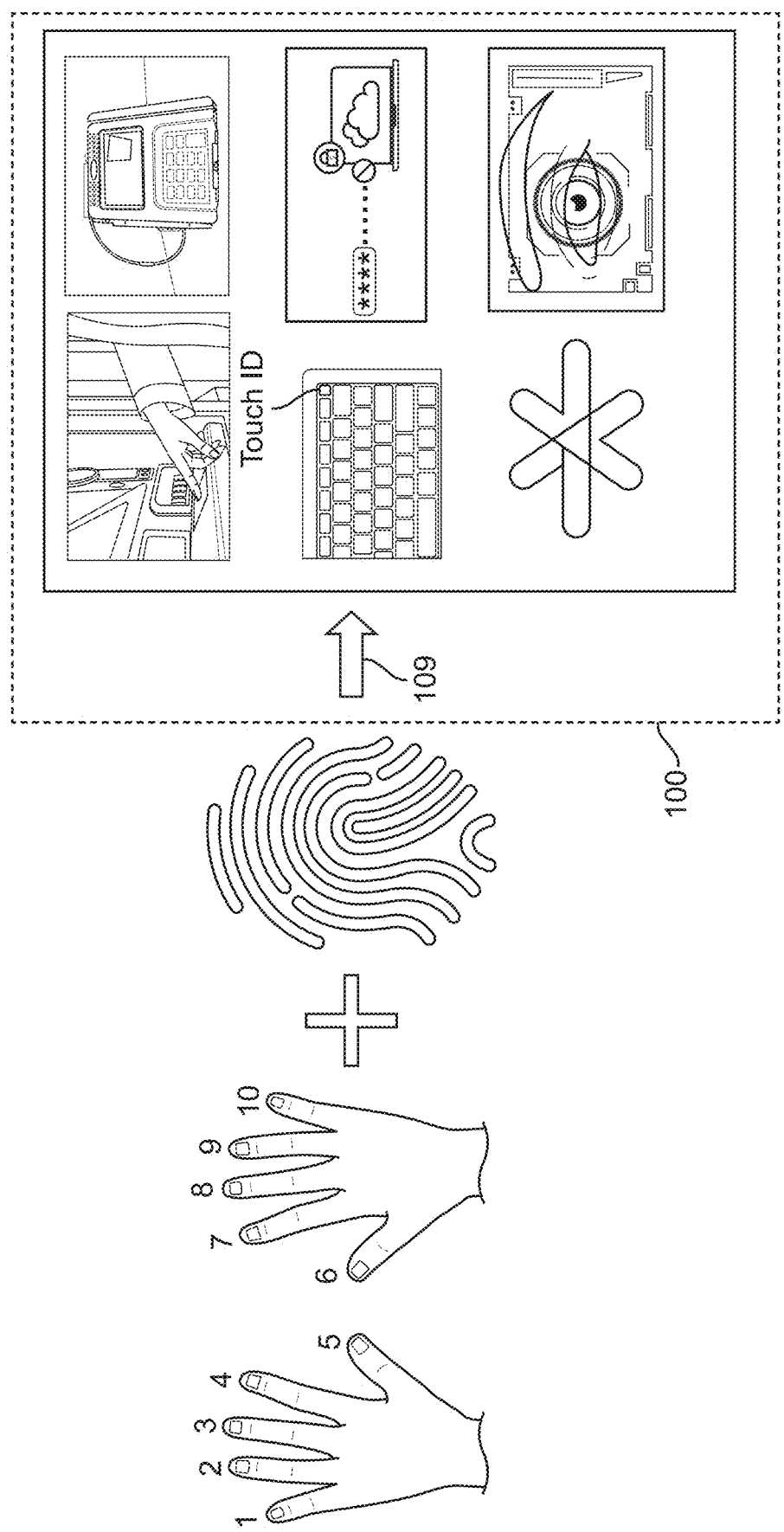
FIG. 3 is a graphical block diagram illustrating a method for identifying, validating and authenticating a user using biological patterns, according to one or more embodiments of the present invention.
Figure 4:
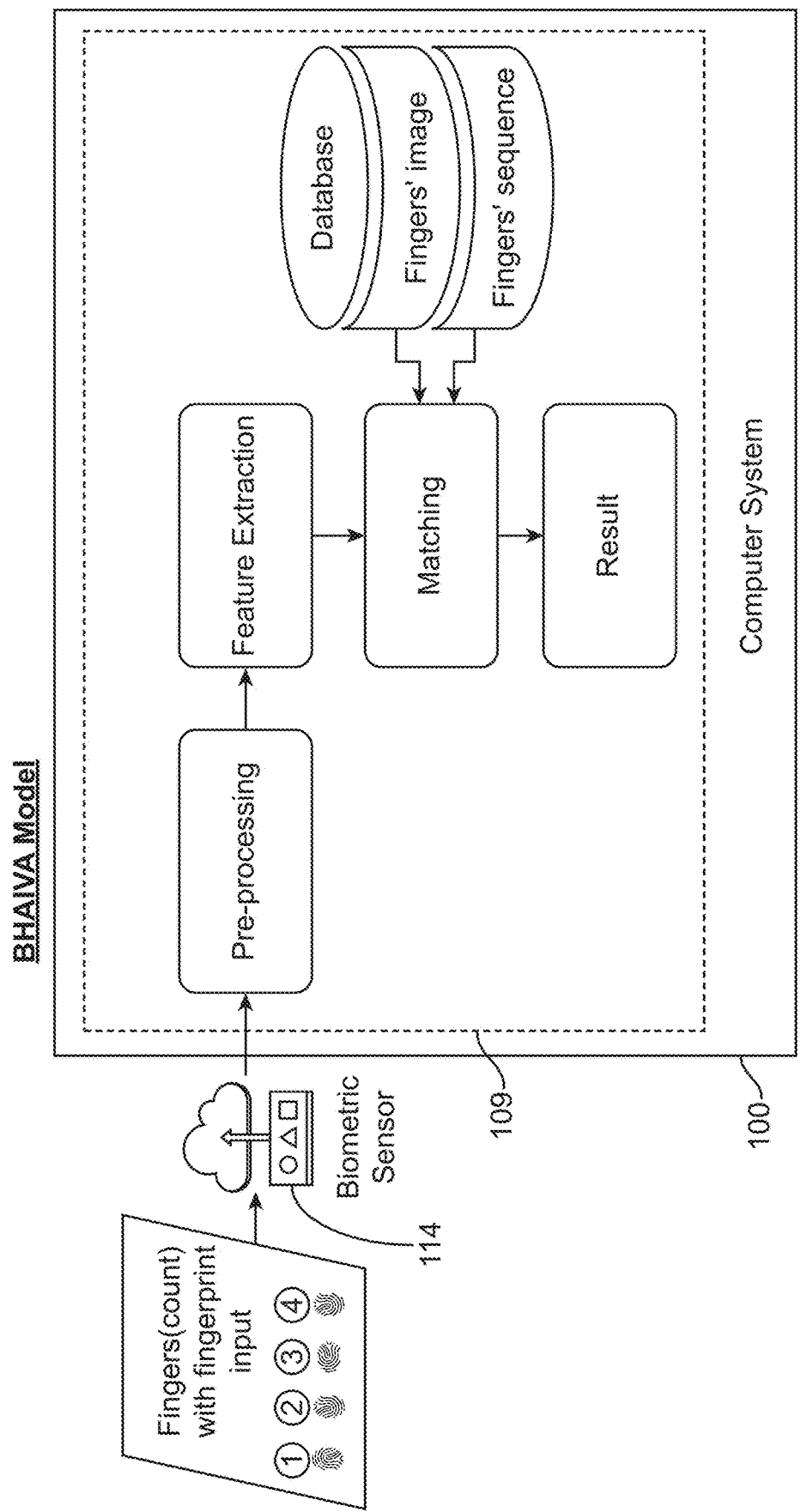
FIG. 4 is a graphical block diagram illustrating a method for identifying, validating and authenticating a user using biological patterns, in accordance with one or more embodiments of the present invention.

Referring to FIG. 2, FIG. 3 and FIG. 4, a method executed by authentication software 109 of the computer system 100 for identifying, validating and authenticating a user or a transaction using biological patterns and numbers is provided, in accordance with an embodiment. It should be appreciated that although the authentication software 109 is disclosed herein as being a part of the software 111 of the computer system 100, in other embodiments, the authentication software 109 may be part of an authentication module (not shown) that is disposed external to the computer system 100. As briefly discussed above, the method executed by the authentication software 109 of the computer system 100 applies a BHAIVA approach to provide a way of using 'biological passwords' via the fingers (and possibly toes) for user recognition, thereby replacing the standard passwords/PINs with the fingers and fingerprints of the user. As each user has fingerprints that are specific and unique to that user, this makes it extremely difficult, if not impossible, for the security of the authentication/validation system to be breached. In an embodiment, an authentication/validation system is set up by a user selecting a password that uses only specific fingers as a sequence or combination pattern to provide a first level of security.

The user may select these fingers by entering a number that was assigned to a specific finger by the computer system 100. For example, in one embodiment, the authentication software 109 of computer system 100 may assign each finger on the hands of user a specific number from 1 to 10. In this case, the authentication software 109 of computer system 100 may assign the fingers on the user's left hand the following numerical values: Pinky Finger-number 1; Ring Finger-number 2; Middle Finger-number 3; Index Finger-number 4; and Thumb Finger-number 5. Similarly, the fingers on the user's right hand may be assigned the following numerical values: Thumb Finger-number 6; Index Finger-number 7; Middle Finger-number 8; Ring Finger-number 9; and Pinky Finger-number 10. After the user enters the numerical value of the specific fingers to be used for the password, the authentication software 109 of computer system 100 may allow the user to select whether the user wishes to enter the password in a sequential pattern or in a combination/cluster pattern. Once the user selects the format in which to enter the password (i.e., sequential pattern or in a combination/cluster pattern), the user enters the fingerprints for the selected fingers into the system via a biometric sensing device 114, where the finger/fingerprint match is stored.

In accordance with an embodiment, when the system and method authenticates a user, the authentication software 109 of computer system 100 may prompt (e.g., via display on the display 119 and/or audio on the speaker 123) the user to enter each finger and its respective fingerprint into the system using a biometric sensing device 114 in the format previously selected by the user. The entered fingers/fingerprints may then be processed to identify which fingers/fingerprints were entered and what the pattern was in which they were entered. The authentication software 109 of computer system 100 compares the entered fingers/fingerprints with the fingers/fingerprints of the previously selected password that is on file (e.g., stored in memory) to determine if a match is achieved. The authentication software 109 of computer system 100 compares the pattern in which the fingers/fingerprints were entered with the pattern that was selected for the previously selected password that is on file, also to determine if a match is achieved. If both the fingers/fingerprints and the entry pattern of the fingers/fingerprints match, then the user is allowed access to the system. If both the fingers/fingerprints and the entry pattern of the fingers/fingerprints do not match, the user is denied access to the system.

Figure 5:
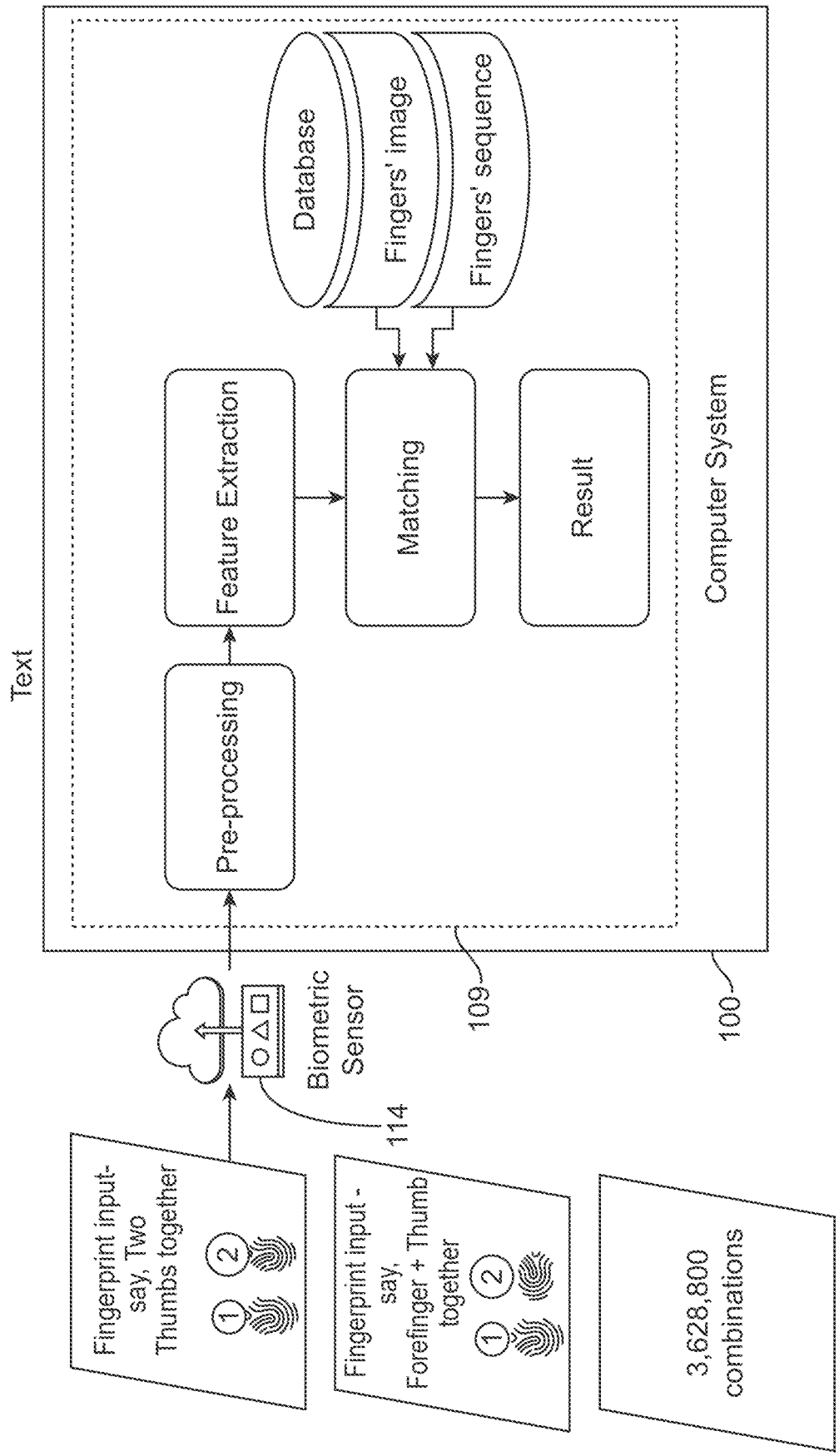
FIG. 5 is a graphical block diagram illustrating a method for identifying, validating and authenticating a user using biological patterns, in accordance with one or more embodiments of the present invention.
Figure 6:
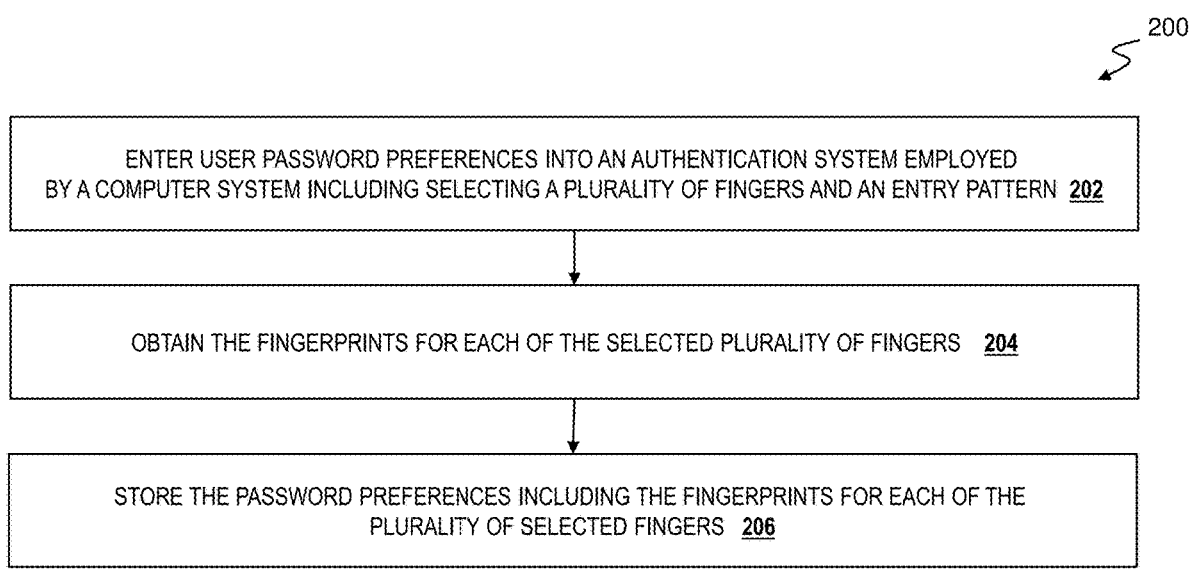
FIG. 6 is a flowchart of a computer-implemented method for identifying, validating and authenticating a user using biological patterns, according to one or more embodiments of the present invention.

In an embodiment and referring to FIG. 5, the authentication software 109 of computer system 100 may provide a user with the ability to reset and change the password by entering the system using a preselected combination of fingers/fingerprints and entry pattern. For example, consider one situation where when the user was set up in the authentication software 109, the user selected the combination of both thumbs/thumbprints being entered as a combination to allow the user to reset the password. Accordingly, if the user wishes to reset and change the password, the user may enter the system using the thumbs/thumbprints. Once the user enters the system using this password, the user would be allowed to reset and change the password. In another example, consider the situation where when the user was set up in the authentication software 109, the user selected the combination of the index finger/index fingerprint and thumb/thumbprint being entered as a combination to allow the user to reset the password, where the thumbprint is oriented at 270° from normal. Accordingly, if the user wishes to reset and change the password, the user may enter the system using the index finger/index fingerprint and thumb/thumbprint, wherein the thumbprint is oriented at 270°. Once the user enters the system using this password, the user would be allowed to reset and change the password.

In accordance with an embodiment, a method 200 executed by the authentication software 109 for creating an authorized user on the computer system 100 that employs an authentication software 109 which implements a method for identifying, validating and authenticating a user using biological patterns and numbers is provided, as shown in FIG.

6. The method 200 includes a user entering password preferences into the computer system 100, as shown in operational block 202. As discussed previously, this may require the user to select a plurality of fingers which the user wishes to use along with an entry pattern of the plurality of fingers to satisfy the first security level for the password. The method 200 also includes obtaining fingerprints for each of the selected fingers, as shown in operational block 204. This may be accomplished via a biometric scanning device which scans and enters the relevant fingerprints into the system. The entered fingers/fingerprints and entry combination are stored by the computer system 100 for future use, as shown in operational block 206.

Figure 7:
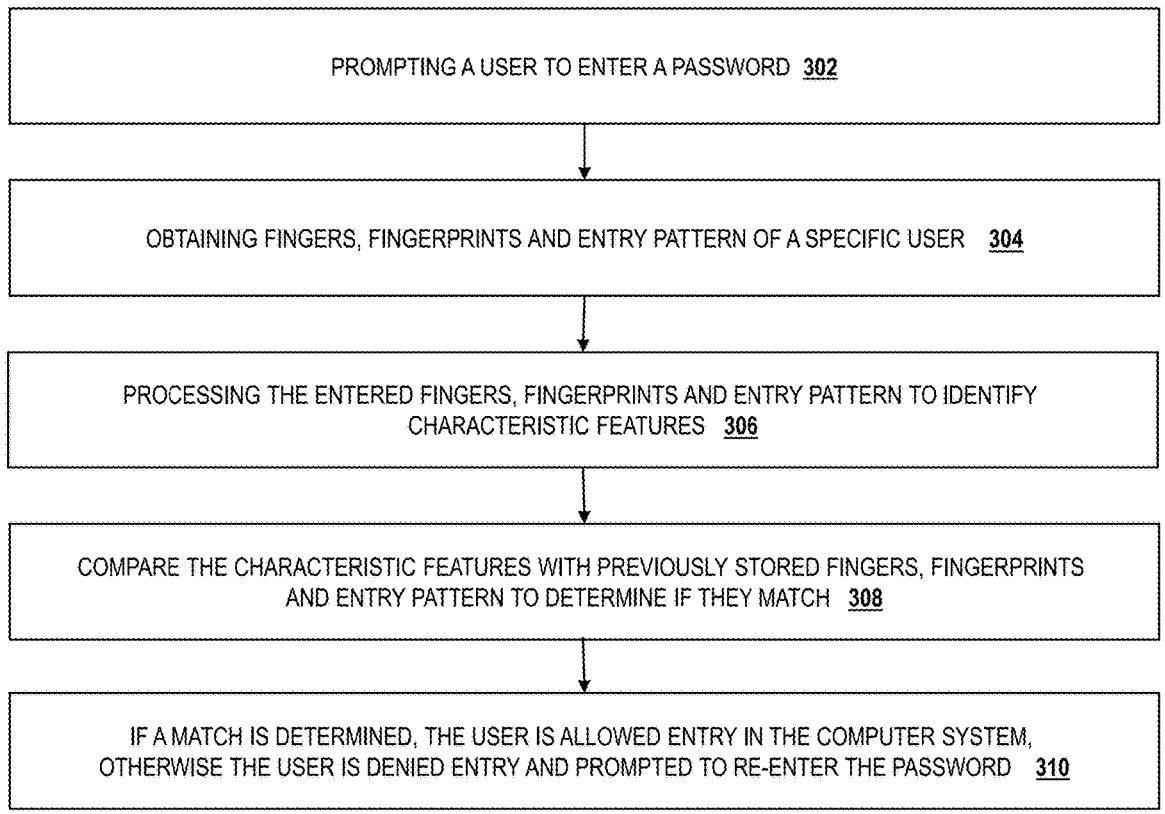
FIG. 7 is a flowchart of a computer-implemented method for identifying, validating and authenticating a user using biological patterns, according to one or more embodiments of the present invention.

In accordance with an embodiment, a method 300 executed by the authentication software 109 for identifying, validating and authenticating a user using biological patterns and numbers is provided, as shown in FIG. 7. The method 300 includes an authentication software 109 prompting a user to enter a password, as shown in operational block 302, where the password is responsive to a user's fingers/fingerprints and entry pattern of the user's fingers/fingerprints. The method 300 includes the authentication software 109 obtaining the fingers/fingerprints and entry pattern for a specific user, as shown in operational block 304. This may be accomplished via a biometric scanning device which may scan and enter the relevant fingers/fingerprints and entry pattern into the authentication software 109. The method 300 further includes processing the entered fingers/fingerprints and entry pattern to identify characteristic features of the entered fingers/fingerprints and entry pattern, as shown in operational block 306. The characteristic features are compared with previously selected fingers/fingerprints and entry pattern of the specific user to determine if the fingerprints and the entry pattern matches, as shown in operational block 308. If the authentication software 109 determines that a match has occurred, the user may be allowed entry into the computer system, otherwise the user is denied entry into the computer system and the user may be prompted to reenter the password, as shown in operational block 310.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
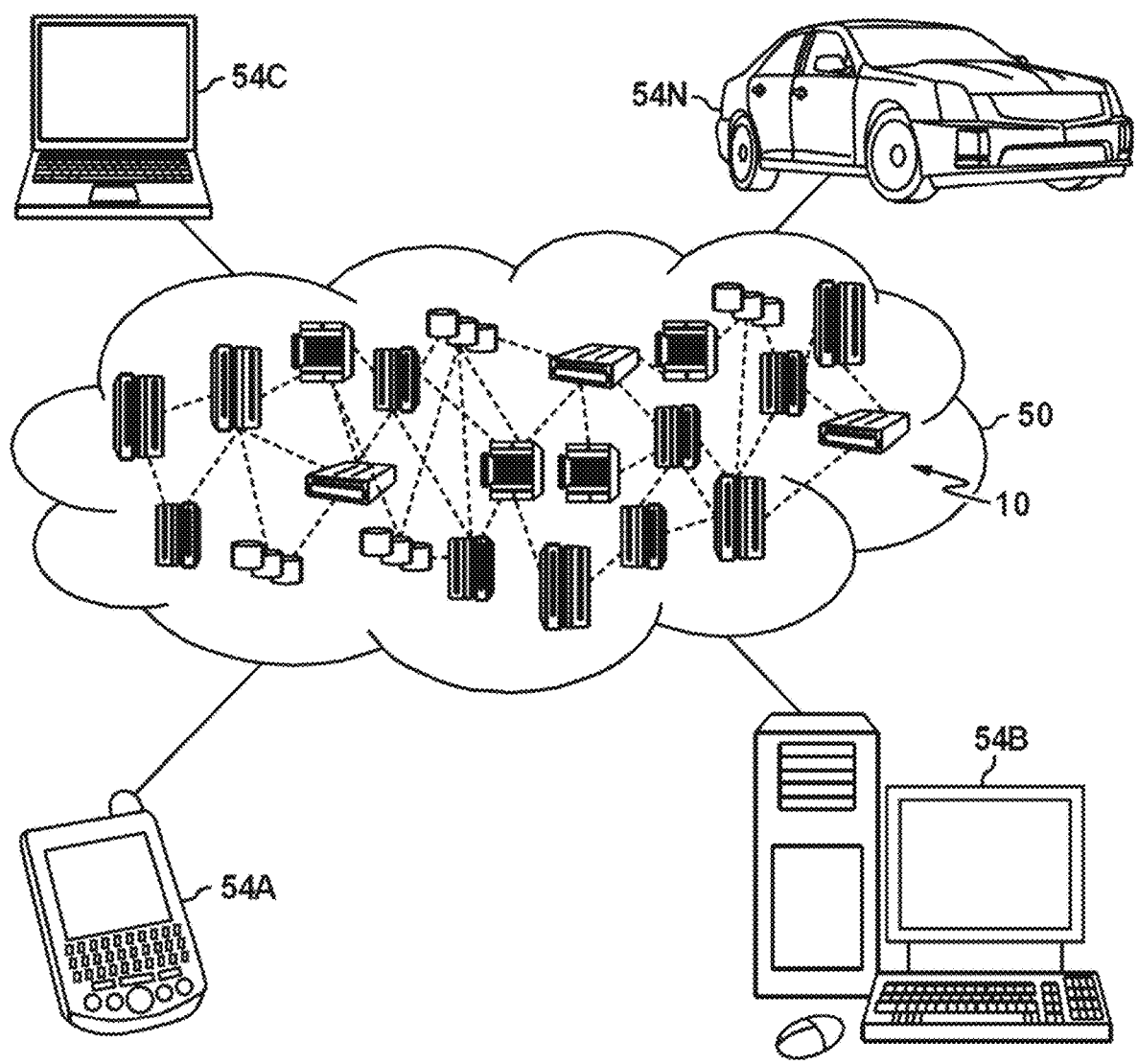
FIG. 8 depicts a cloud computing environment according to one or more embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 9:
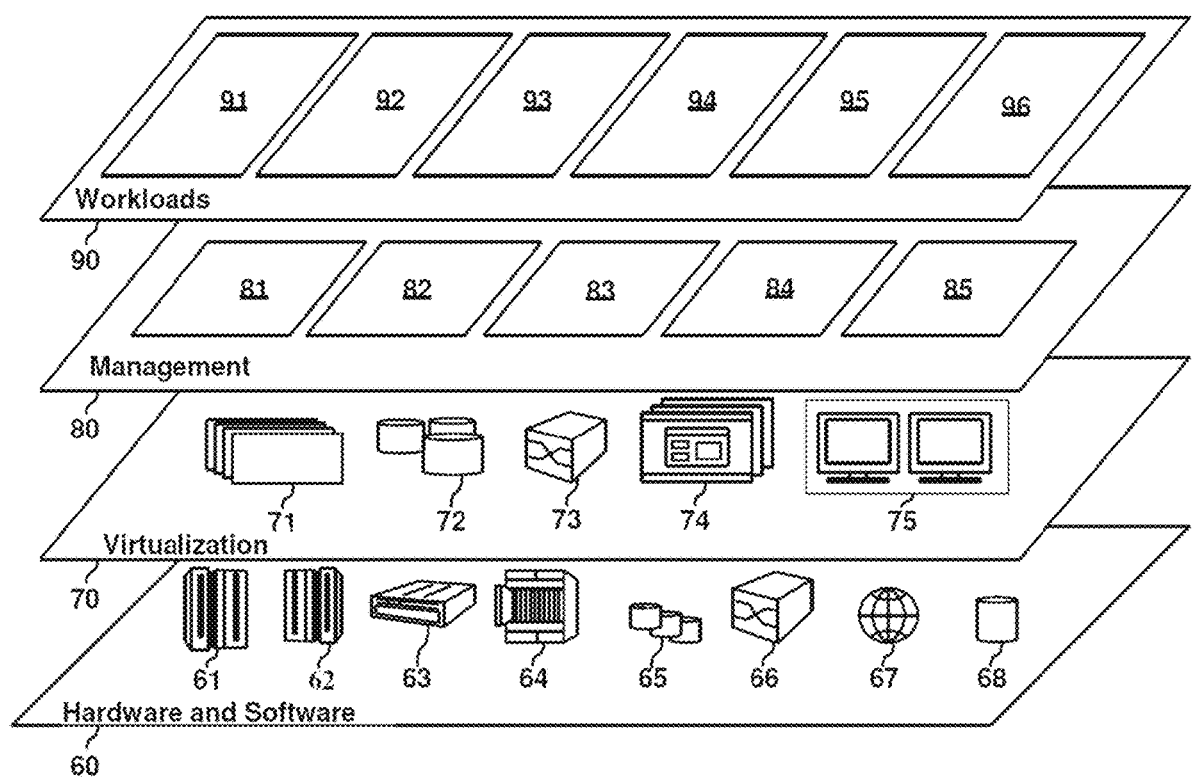
FIG. 9 depicts abstraction model layers according to one or more embodiments of the present invention.

Referring now to FIG. 9, a set of functional abstraction layers provided by cloud computing environment 50 (depicted in FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for identifying, validating and authenticating a user using biological patterns and numbers, the method comprising:
   prompting a user to enter a password into an authentication software,
   wherein the password is responsive to a plurality of selected user fingers, a plurality of selected user fingerprints, and a selected entry pattern of the user fingers and the user fingerprints;
   assigning digits in an increasing order to the user fingers on both a left hand and a right hand of the user;
   in response to assigning digits in the increasing order to the user fingers on both the left hand and the right hand of the user, asking the user to select whether the user wishes to enter the password in a sequential manner of single digits at a time or multiple digits at a time, wherein the single digits correspond to single fingers and the multiple digits correspond to multiple fingers;
   operating a biometric sensing device to obtain biometric data responsive to sensed user fingers, sensed user fingerprints, and sensed entry pattern;
   processing the biometric data to determine characteristic features of at least one of the sensed user fingers, the sensed user fingerprints, and the sensed entry pattern;
   comparing the characteristic features with user data to determine if the characteristic features match the user data; and
   allowing or denying entry of the user into a computer system responsive to the characteristic features.

2. The computer-implemented method of claim 1, wherein the selected entry pattern includes a finger placement pattern.

3. The computer-implemented method of claim 2, wherein the finger placement pattern includes one of the plurality of user fingers disposed in a different orientation than a remaining plurality of user fingers.

4. The computer-implemented method of claim 1, wherein operating includes activating the biometric device to allow the user to input the biometric data, wherein the biometric data includes the sensed user fingers, the sensed user fingerprints and the sensed entry pattern.

5. The computer-implemented method of claim 1, further comprising storing the sensed user fingers, the sensed user fingerprints and the sensed entry pattern in a storage device associated with the computer system.

6. The computer-implemented method of claim 1, wherein:
   the user data includes at least one of the selected user fingers, the selected user fingerprints and the selected entry pattern,
   the characteristic features includes at least one of the sensed user fingers, the sensed user fingerprints and the sensed entry pattern, and
   comparing includes comparing the characteristic features with the user data to determine if at least one of the selected user fingers matches the sensed user fingers, the selected user fingerprints match the sensed user fingerprints and the selected entry pattern matches the sensed entry pattern.

7. The computer-implemented method of claim 6, wherein:
   if the characteristic features match the user data, then the user is allowed access to the computer system; and
   if the characteristic features do not match the user data, then the user is denied access to the computer system.

8. A system comprising:
   a memory having computer readable instructions; and
   one or more processors for executing the computer readable instructions, the computer readable instructions controlling the one or more processors to perform operations comprising:
      prompting a user to enter a password into an authentication software, wherein the password is responsive to a plurality of selected user fingers, a plurality of selected user fingerprints and a selected entry pattern of the user fingers and the user fingerprints;
      assigning digits in an increasing order to the user fingers on both a left hand and a right hand of the user;
      in response to assigning digits in the increasing order to the user fingers on both the left hand and the right hand of the user, asking the user to select whether the user wishes to enter the password in a sequential manner of single digits at a time or multiple digits at a time, wherein the single digits correspond to single fingers and the multiple digits correspond to multiple fingers;

receiving biometric data via a biometric sensing device, wherein the biometric data is responsive to sensed user fingers, sensed user fingerprints and sensed entry pattern;

processing the biometric data to determine characteristic features of at least one of the sensed user fingers, the sensed user fingerprints and the sensed entry pattern;

comparing the characteristic features with user data to determine if the characteristic features match the user data; and allowing or denying entry of the user into a computer system responsive to the characteristic features.

9. The system of claim 8, wherein the selected entry pattern includes a finger placement pattern.

10. The system of claim 9, wherein the finger placement pattern includes one of the plurality of user fingers disposed in a different orientation than the remaining plurality of user fingers.

11. The system of claim 8, wherein operating includes activating the biometric device to allow the user to input the biometric data, wherein the biometric data includes the sensed user fingers, the sensed user fingerprints and the sensed entry pattern.

12. The system of claim 1, further comprising storing the sensed user fingers, the sensed user fingerprints and the sensed entry pattern in a storage device associated with the computer system.

13. The system of claim 8, wherein:
the user data includes at least one of the selected user fingers, the selected user fingerprints and the selected entry pattern,
the characteristic features includes at least one of the sensed user fingers, the sensed user fingerprints and the sensed entry pattern, and
comparing includes comparing the characteristic features with the user data to determine if at least one of the selected user fingers matches the sensed user fingers, the selected user fingerprints match the sensed user fingerprints and the selected entry pattern matches the sensed entry pattern.

14. The system of claim 13, wherein:
if the characteristic features match the user data, then the user is allowed access to the computer system; and
if the characteristic features do not match the user data, then the user is denied access to the computer system.

15. A computer program product comprising a computer readable storage medium having program instructions embodied therewith, the program instructions executable by one or more processors to cause the one or more processors to perform operations comprising:

prompting a user to enter a password into an authentication software, wherein the password is responsive to a plurality of selected user fingers, a plurality of selected user fingerprints and a selected entry pattern of the user fingers and the user fingerprints;

assigning digits in an increasing order to the user fingers on both a left hand and a right hand of the user;

in response to assigning digits in the increasing order to the user fingers on both the left hand and the right hand of the user, asking the user to select whether the user wishes to enter the password in a sequential manner of single digits at a time or multiple digits at a time, wherein the single digits correspond to single fingers and the multiple digits correspond to multiple fingers;

receiving biometric data via a biometric sensing device, wherein the biometric data is responsive to sensed user fingers, sensed user fingerprints and sensed entry pattern;

processing the biometric data to determine characteristic features of at least one of the sensed user fingers, the sensed user fingerprints and the sensed entry pattern;

comparing the characteristic features with user data to determine if the characteristic features match the user data; and allowing or denying entry of the user into a computer system responsive to the characteristic features.

16. The computer program product of claim 15, wherein the selected entry pattern includes a finger placement pattern.

17. The computer program product of claim 16, wherein the finger placement pattern includes one of the plurality of user fingers disposed in a different orientation than the remaining plurality of user fingers.

18. The computer program product of claim 15, wherein operating includes activating the biometric device to allow the user to input the biometric data, wherein the biometric data includes the sensed user fingers, the sensed user fingerprints and the sensed entry pattern.

19. The computer program product of claim 15, wherein:
the user data includes at least one of the selected user fingers, the selected user fingerprints and the selected entry pattern,
the characteristic features includes at least one of the sensed user fingers, the sensed user fingerprints and the sensed entry pattern, and
comparing includes comparing the characteristic features with the user data to determine if at least one of the selected user fingers matches the sensed user fingers, the selected user fingerprints match the sensed user fingerprints and the selected entry pattern matches the sensed entry pattern.

20. The computer program product of claim 19, wherein:
if the characteristic features match the user data, then the user is allowed access to the computer system; and
if the characteristic features do not match the user data, then the user is denied access to the computer system.

* * * * *